United States Patent [19]
Roquette

[11] Patent Number: 6,099,905
[45] Date of Patent: Aug. 8, 2000

[54] PROCESS FOR PROVIDING AN INDELIBLE DECORATION ON THE OUTER SURFACE OF A GLASS VOLUME SUCH AS A BOTTLE OR A FLASK

[75] Inventor: Michel Roquette, Paris, France

[73] Assignees: Saga Decor, Point-Sainte-Maxence; JH Holding, Petersbach, both of France

[21] Appl. No.: 08/993,226

[22] Filed: Dec. 18, 1997

[30] Foreign Application Priority Data

Dec. 20, 1996 [EP] European Pat. Off. .............. 96440113

[51] Int. Cl.⁷ ...................................................... B05D 1/02
[52] U.S. Cl. ..................... 427/279; 427/287; 427/376.2; 427/427
[58] Field of Search ...................................... 427/180, 197, 427/193, 199, 279, 287, 376.2, 427; 428/208, 325, 428; 65/60.8; 501/14

[56] References Cited

U.S. PATENT DOCUMENTS 4,073,992  2/1978  Lerman et al. .
5,306,674  4/1994  Ruderer et al. ........................... 501/70

FOREIGN PATENT DOCUMENTS 56-41856  of 1981  Japan .

OTHER PUBLICATIONS

"Ceramics and Glasses", ASM Engineered Materials Handbook® pp. 260–263, 1991.

*Primary Examiner*—Fred J. Parker
*Attorney, Agent, or Firm*—Abelman, Frayne & Schwab

[57] ABSTRACT

This invention relates to a process for producing on the outer surface of a glass volume, such as a bottle or flask, an indelible decoration consisting of fine particles of enamel each fused in situ with the surface layer of glass of the volume. The process consists in spraying onto the said outer surface a frit of enamel particles having a melting point lower than the softening point of the glass and a coefficient of expansion close to that of the glass, under conditions such that the frit remains temporarily in place on the surface and, while the frit is in place in this way on the surface, it is fired by heat treatment at a temperature such that the frit particles melt on the surface while fusing with it, but retain their individuality without associating together to form a continuous film.

The frit is used in a suspended state in an oil-aqueous binder so as to constitute a slip which is sufficiently viscous to adhere to the outer surface of the bottle. The slip is then sprayed onto the surface by means of a pneumatic gun operated by compressed air. The heat treatment brings about simultaneously fusion of the enamel particles constituting the frit, their individual fusion with the surface of the glass and the elimination of the said binder.

9 Claims, No Drawings

PROCESS FOR PROVIDING AN INDELIBLE DECORATION ON THE OUTER SURFACE OF A GLASS VOLUME SUCH AS A BOTTLE OR A FLASK

BACKGROUND OF THE INVENTION

The present invention concerns the field of bottles, flasks and similar volumes made of glass, designed in a general manner so as to contain wine or similar alcoholic products and of which the outer surface has been subjected to a treatment designed to create a decorative or at least original effect, contributing to the identification of the origin of such volumes, or contributing to their customer appeal.

A great variety of such decorated volumes already exists, obtained by very different treatments.

In all the following, reference will be made to bottles, which represent the most usual volumes subjected to such treatments.

A first category of treatments involves removing material, namely glass, from the surface.

An example of a treatment of this type is the spraying of very fine grains of abrasive material, for example corundum, onto the outer surface of the bottle. A hollow graining effect is thus obtained, which is considered to be visually unsatisfactory. Another example is the abrasion of the surface by means of an acid and/or corrosive reagent. Only a satin effect is then obtained by opacifying the wall of the bottle, at the cost of pollution of the environment and working conditions which are dangerous for the operators.

A second category of treatment involves depositing foreign agents on the outer surface of the bottle.

An example of such a treatment by a material applied to the surface of the bottle is the electrostatic deposition of fine particles which must then be "fixed" by means of a suitable coating. Another example is the deposition of particles on the said surface, which has previously been covered by such a coating acting as an adhesive for these particles.

In both cases, the coating does not withstand mechanical friction or heat, which removes the fixing coating, the particles having no tendency in themselves to adhere to the glass.

Yet another treatment by means of the application of foreign particles on the surface of the bottle consists of applying enamels to this surface having the form of coloured particles mixed with a heat-fusible or oily binder, this mixture being applied by using the silk screen printing technique. After application, the whole is fired to the melting point of the enamel, at which the binder evaporates and the particles melt while fusing together and covering the support with a continuous smooth layer. By using successive layers according to the four-colour technique, smooth and continuous coloured decorative patterns are obtained on bottles, which represents a strict limitation of the field of application of this technique.

BRIEF SUMMARY OF THE INVENTION

Compared with this prior state of the art, the present invention concerns a novel bottle bearing an indelible decoration of which the elements, in the form of fine enamel particles, are not fused together, but are fused individually with the surface zone of the glass constituting the bottle and hence form an integral part of the outer surface of the bottle. According to a preferred embodiment of the invention, the said particles have sizes and an appearance such that the entire decoration thus produced creates a discontinuous particulate visual and tactile impression of a patina and/or a layer of dust on the surface of the bottle.

According to a first feature, the invention thus concerns a glass bottle on the outer surface of which individual particles have been deposited in an indelible manner creating a discontinuous particulate visual and tactile impression of a patina and/or a layer of dust, these particles forming an integral part of the said surface, namely being resistant both to abrasion and heat.

According to a second feature, the invention concerns a process for producing such a deposit, a process consisting, according to its preferred embodiment, of starting from a frit of very fine enamel particles, of the order of 5 to 200 microns, having a melting point slightly lower than the melting point of the glass of the bottle, namely of the order of 620 to 645° C., and a coefficient of expansion very close to that of the glass of the bottle, namely approximately $82 \times 10^{-7}$, while that of soda-lime glass is $85 \times 10^{-7}$, of spraying the said particles onto the outer surface of the bottle, and of firing these particles in situ by a heat treatment causing the enamel particles to fuse with the glass of the bottle.

DETAILED DESCRIPTION OF THE INVENTION

According to this preferred embodiment of this process, this frit is mixed with an oleo-aqueous solution with a view to constituting a very viscous suspension or slip, this slip is sprayed under pressure by means of a gun onto the outer surface of the bottle, and the whole is fired so as to bring about individual fusion of the said particles, without however causing the glass of the bottle to soften, the said solution being eliminated simultaneously.

Such a slip may preferably contain a proportion of 52 to 59% by weight of enamel particles having a particle size distribution of between 5 and 200 microns, in a binder containing 15 to 18% of an oily agent and 24 to 28% of water, as well as optionally a colorant.

It should be understood that the procedures for putting this basic process into operation can vary in relation to the final appearance of the decoration to be obtained, namely the "rendering" of the patina or layer of dust thus artificially created.

In particular, with the particle size of the enamel particles being fixed, preferably between 5 and 200 microns, it is possible, according to the invention, to obtain a complete range of appearances for the coating with the same gun, according to the surface density of the said particles on the outer surface of the bottle or, better still, of the weight of these particles deposited on the bottle. At one end of this range, it is possible to create a coating having an appearance which is quite similar to a natural patina, and which is practically non-transparent, the particles being practically joined close to each other, which makes the coating rough to the touch. The total weight of the particles thus deposited on the surface of a bottle is then of the order of 0.80 mg/cm². At the other end of the range, it is possible to create a coating of which the appearance is that of a layer of dust, the grains of which are visibly spaced by a distance of the order of a fraction of a millimeter, and which is thus sufficiently transparent to allow the contents of the bottle to be seen. In this case, the total weight of the particles deposition a surface of the bottle is of the order of 0.15 mg/cm². Between these two extremes, it is possible to create an infinite number of intermediate appearances, starting with the principle that, whatever the proportion of the enamel particles in relation to the binder in the composition sprayed, the concentration or surface density of the said individual particles on the outer surface of the bottle is inversely proportional to the distance of the bottle from the said gun and/or the spread of the jet of composition sprayed by the gun towards the bottle, as well as, to a subsidiary extent, to the inclination of the axis of the spray with respect to the axis of the bottle in rotation.

In addition, the spray procedures may be modified, while remaining within certain limits.

Thus, in the case of a spray, from a compressed air gun, of a slip consisting of a suspension of the frit in a viscous binder, the conditions for spraying by a gun of the HVLP type, marketed by the BINKS company, may vary between the following limits:

pressure in the reservoir (slip supply): 0.5 to 2 bar;

compressed air pressure: 2.5 to 6 bar;

diameter of the spray nozzle: 0.8 to 1.2 mm;

spray distance: 170 to 200 mm;

axis of inclination of the gun with respect to the axis of the bottle: 45 to 90°.

It is in particular these variable factors which are illustrated in the following examples, which describe various embodiments of the process according to the invention, these examples being given by way of illustration and in no way representing a limitation to the field protected by the present invention.

EXAMPLE 1

This example illustrates the manner in which a bottle can be obtained having the characteristic of being coated with a substantially uniform layer of particles strongly suggesting a dusty appearance known under the name of "dust effect" or "cask dust".

This embodiment of the process consists of starting from a 52.77% suspension by weight of a frit of enamel particles marketed under the designation "VN 9308" by the CERDEC Company, Limoges, France, in a suspension containing, by weight, 16.72% of an oily medium, marketed under the designation Medium reference 60685 by the CERDEC Company, and 27.57% water, the complement being an ochre colorant. These particles have a mean particle size of 5 microns.

This suspension was made homogeneous by rotating it in a drum at room temperature for two to three hours, which resulted in a slip having a viscosity of 4.5 to 5 minutes, evaluated by the Ford Cup method.

This suspension was then sprayed under pressure by a gun having the following characteristics:

HVLP gun, marketed by the BINKS company;

pressure in the reservoir of the gun: 1.5 bar;

compressed air supply pressure: 4 bar;

diameter of the nozzle opening: 0.8 mm;

spraying distance: 200 mm to 120–160 mm, from the bottom of the bottle;

axis of the gun at 90° with respect to that of the bottle, on a bottle given a rotational movement about a horizontal axis until all the outer surface of the bottle was covered by the said suspension.

This coating was then fired, according to the following cycle: the temperature was increased in approximately 10 minutes to approximately 620–645° C., this temperature being the melting point of the enamel particles, whereas the softening point of the glass was approximately 650° C. Under these conditions, each of the enamel particles adhered in situ onto the outer surface of the glass without the latter being affected, and without the particles losing their individuality.

This heat treatment was continued for about 10 minutes and the temperature was then progressively brought to room temperature.

After this cooling, a bottle was obtained having a visual and tactile appearance entirely comparable to that of a bottle having been covered in dust over several years.

The weight of enamel deposited (after elimination of the binder by heat) was 0.3 g per bottle.

EXAMPLE 2

Example 1 was repeated, modifying the spraying conditions in the following manner:

pressure in the reservoir: 2.2 bar;

spraying pressure: 4.5 bar;

diameter of the nozzle opening: 0.8 mm;

spraying distance: 200 mm to 50 mm from the bottom of the bottle;

axis of the spray: perpendicular to the axis of the bottle.

A deposit of only 0.15 g was obtained, localized however in the area of the spray instead of being uniform.

EXAMPLE 3

Example 1 was repeated, modifying however the spraying conditions in the following manner:

pressure in the reservoir: 2.2 bar;

spraying pressure: 4.5 bar;

diameter of the nozzle opening: 0.8 mm;

spraying distance: 160 mm from the front of the neck to the shoulder of the bottle;

axis of the spray: 45° with respect to the axis of the bottle.

A deposit of 0.15 g was obtained, localized on the neck and especially on the shoulder of the bottle, known under the name of "shoulder dust".

EXAMPLE 4

Example 1 was repeated with the following modifications:

pressure in the reservoir: 1.3 bar;

spraying pressure: 4 bar.

A more marked shoulder dust effect was obtained, on account of the weight of the deposit being increased to 0.4 g.

EXAMPLE 5

Example 3 was repeated with the following modifications:

pressure in the reservoir: 1 bar;

spraying pressure: 5 bar.

The shoulder effect was reduced, the weight deposited being brought to 0.18 g.

It clearly follows from these examples that, according to the invention, the procedure for applying this embodiment of the process may be modified quite widely according to the effects that it is desired to produce on the bottles.

However, it is in practice imperative, according to the preferred embodiment of the invention, that certain lower and upper limits respectively are observed for certain of these factors, the results obtained outside these intervals thus defined not being generally satisfactory.

Thus, as regards:

the particle size of the enamel grains, this must be between 5 and 200 microns; below 5 microns, the particles cannot retain their individuality, and above 200 microns, the slip can no longer be conveniently handled, and above all no dust is formed from such large particles, so that such a decoration would not be credible.

the melting point of the enamel particles must be between 620 and 645° C., so as to remain below the softening point of the glass of the bottle;

their coefficient of expansion must be $82\times10^{-7}$, as close as possible to that of the glass of the bottle, so as to prevent stresses.

Subject to the preferred limitations above, which fall within the scope of the present invention, it will be easy for specialists to vary the operating procedures enumerated above in many ways, according to special cases and to the objectives to be achieved artistically and decoratively.

Thus, as illustrated in example 3, with a view to increasing still further the realism of the "dusty" appearance of the bottles, a non-uniform deposit may be made, namely one not affecting all the surface of the bottle to the same extent, but being for example more intense in the area of the bottle supposed to have been more exposed to dust than others.

Deposition of the imitation dust may be carried out after the bottle has received the usual decorations (for example a label, a coat of arms, a seal, etc).

It will be noted that, in order to comply with certain regulations connected with the protection of public health, the enamel used in the particles is preferably free from lead.

The invention is hence not limited to the examples thus given above, but is defined by the following claims.

What is claimed is:

1. A process for producing on the outer surface of a glass volume, including bottles or flasks, an indelible decoration consisting of particles of enamel each fused in situ with the surface layer of glass of said volume, which comprises:

a) spraying onto said outer surface a slip containing a frit of enamel particles by a pneumatic gun, said frit having a melting point lower than the softening point of said glass and a coefficient of thermal expansion comparable to that of said glass, said slip comprising a suspension of liquid binder of oil and water with the frit suspended therein, said slip having a viscosity on the of 4.5 to 5 minutes evaluated by the Ford Cup method, which is sufficiently viscous such that said frit remains temporarily in place on said surface;

b) firing said frit by heat treatment at a temperature sufficient to melt said frit particles on said surface while fusing with it, while preserving the individuality of the particles, whereby there is created on said outer surface to be decorated a discontinuous visual or tactile impression of a patina or layer of dust.

2. Process according to claim 1, wherein the enamel particles constituting the frit are between 5 and 200 microns in size.

3. Process according to claim 1, wherein the enamel particles constituting the frit have a melting point of between 620° C. and 645° C.

4. Process according to claim 1, wherein the enamel particles constituting the frit have a coefficient of expansion of approximately $82\times10^{-7}$.

5. Process according to claim 1, wherein the average weight of the frit layer deposited on the surface of the glass volume is between 0.15 and 0.80 mg/cm$^2$.

6. Process according to claim 1 wherein the conditions for operating the pneumatic gun used for spraying the slip onto the surface of the glass of the glass volume are as follows:

pressure in the reservoir of the gun: 0.5 to 2 bar;

compressed air supply pressure: 2.5 to 6 bar;

diameter of spray nozzle opening: 0.8 to 1.2 mm;

spraying distance: 170 to 200 mm.

7. Process according to claim 6, wherein the axis of spray from said gun is perpendicular to the axis of the bottle in rotation.

8. Process according to claim 6, wherein the axis of spray from said gun is inclined to the axis of the bottle in rotation at an angle of approximately 45°.

9. Process according to claim 1, wherein the heat treatment of the volume coated with the layer of slip is conducted at a temperature of 620–645° C. for a period of approximately 10 minutes.

* * * * *